United States Patent [19]

Onstott

[11] Patent Number: 4,877,689
[45] Date of Patent: Oct. 31, 1989

[54] HIGH TEMPERATURE INSULATION BARRIER COMPOSITE

[75] Inventor: Joseph W. Onstott, Canoga Park, Calif.

[73] Assignee: United States of America as represented by the Administrator, National Aeronautics and Space Administration, Washington, D.C.

[21] Appl. No.: 252,078

[22] Filed: Sep. 30, 1988

[51] Int. Cl.⁴ .................. B32B 15/04; F16L 59/00
[52] U.S. Cl. ........................ 428/607; 428/623; 428/627; 428/632; 428/666; 428/680; 244/158 A
[58] Field of Search ............. 428/607, 623, 627, 632, 428/666, 680, 685; 244/133, 158 A, 163

[56] References Cited

U.S. PATENT DOCUMENTS 4,639,399 1/1987 Aprigliano ................ 428/632
4,804,571 2/1989 Jouffreau ................ 244/158 A

*Primary Examiner*—L. DeWayne Rutledge
*Assistant Examiner*—George Wyszomierski
*Attorney, Agent, or Firm*—William J. Sheehan; John R. Manning; Charles E. B. Glenn

[57] ABSTRACT

A composite material suitable for providing insulation for the nozzle structure of the Space Shuttle and other similar surfaces is disclosed which comprises an outer skin layer of nickel chromium and an interleaved inner region comprising a top layer of nickel chromium foil which acts as a primary convective shield, at least two layers of alumina batting adjacent to layers of silicon carbide fabric, and an additional layer of nickel chromium foil to be used as a secondary convective shield. The composite is particularly advantageous for use as nozzle insulation because of its ability to withstand high reentry temperatures, its flexibility, oxidation resistance, low conductivity, and light weight.

14 Claims, 1 Drawing Sheet

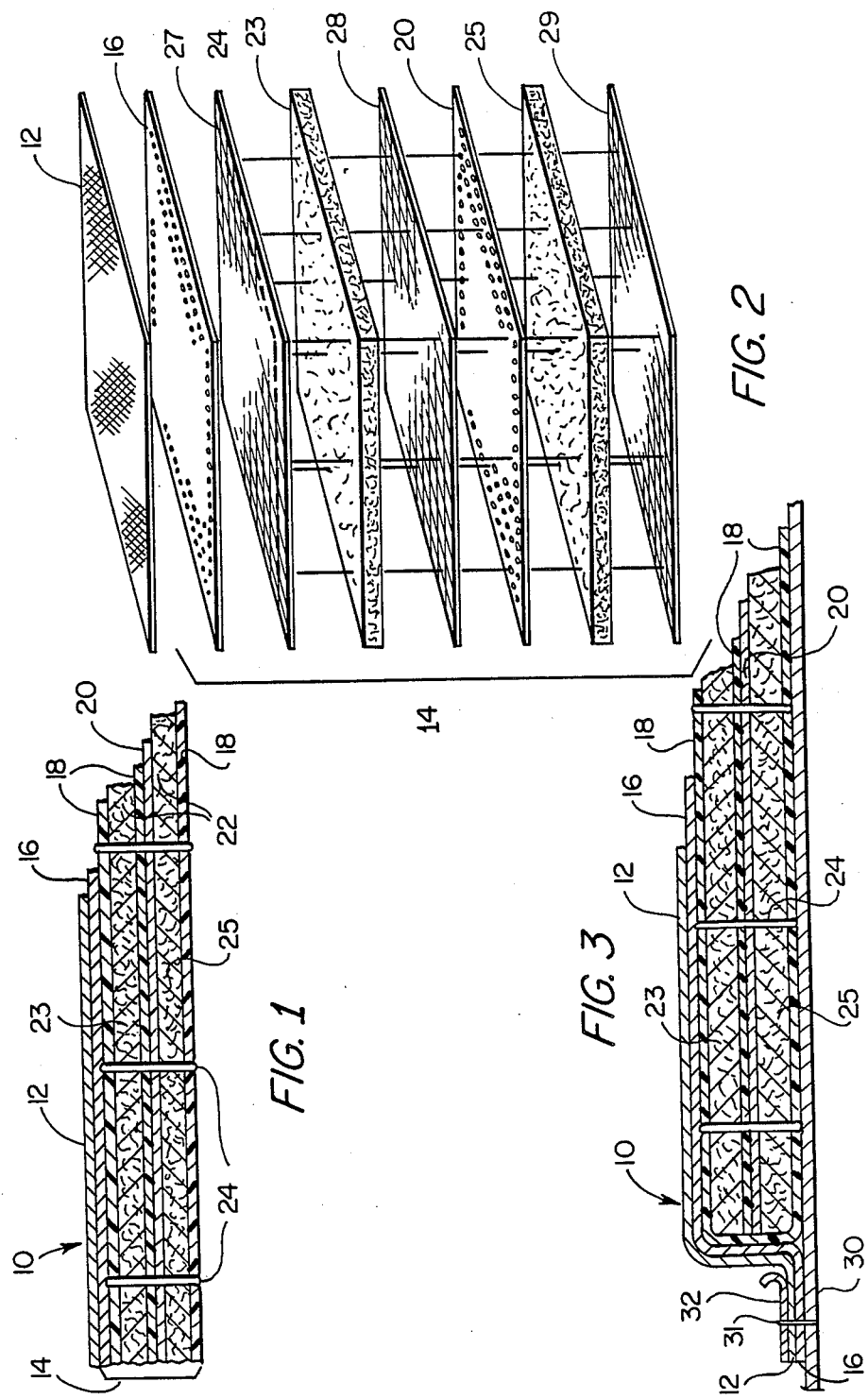

HIGH TEMPERATURE INSULATION BARRIER COMPOSITE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

FIELD OF THE INVENTION

The invention relates in general to a composite material useful as a high temperature insulation barrier, and in particular to a composite comprised of nickel chromium, silicon carbide and alumina batting layers which is suitable for use as an insulation barrier for space shuttle nozzles.

BACKGROUND OF THE INVENTION

One of the main problems faced by today's spacecrafts and other hypersonic vehicles is the great temperatures that must be withstood by the structures of those vehicles. The high temperature conditions faced by vehicles such as the Space Shuttle, particularly during re-entry, are accompanied by extreme physical forces, such as hot gas impingement and both operational and acoustic vibrations as well.

At present, one of the major areas of concern with regard to heat insulation of the Space Shuttle is in the Main Engine (SSME) nozzle section which is exposed to extremely high temperature and other significant physical forces primarily during re-entry into Earth's atmosphere. These engine nozzles must be well insulated in order to remain below specific temperature limits so as to preserve the heat treated structural properties. During the course of a mission, the nozzles will experience significant flexure from start-up transients, change of shape due to pressurization to steady state values, change of size when chilled to operational temperatures, and high acoustic, structural dynamic and aerodynamic loading pressures. These factors rule out use of high temperature ceramics because of their generally brittle nature.

On previous shuttle missions, nozzle insulation has been provided by a barrier consisting of a NiCr screen containment skin, NiCr foil convection shield and a sintered NiCr batting. Although this insulation material can give high temperature protection (about 2550° F.), date from the recent missions indicated that heat loads of up to about 27.72 BTU/ft$^2$-sec will be faced by these nozzles, and the current insulation can withstand only about 22.0 BTU/ft$^2$-sec. Clearly, a material with greater insulation properties is needed for the SSME nozzles.

There are other known methods and materials for enabling space structures to withstand the harsh high temperature environment faced during re-entry. Many examples of such insulation materials are disclosed in the patent art, including those described in U.S. Pat. Nos. 4,581,285; 4,344,591; 4,198,454; 3,799,056; 3,715,265; and 3,203,849. Generally, previously known solutions for this problem either use ablative materials or positive cooling via a heat exchanger. Unfortunately, none of these previously used materials have all of the characteristics necessary to be successfully used as SSME nozzle insulation; Among these required characteristics are flexibility (for nozzle start transients), oxidation resistance (when exposed to high temperature oxygen atmosphere), high emissivity (required for radiation cooling), and vibration resistance (needed for acoustic and operational vibration). In addition, the nozzle insulation material must also be lightweight, as well as easily and securely attachable to the SSME nozzles. A material having all these features would be highly desirable for use on upcoming shuttle missions.

SUMMARY OF THE INVENTION

A lightweight, attachable, high temperature insulation barrier composite suitable for use as a Space Shuttle nozzle structure insulation material is provided in the present invention which comprises an outer skin layer of nickel chromium and an interleaved inner region comprised of a primary convection shield of nickel chromium foil, plus several interleaved layers of a silicon carbide fabric containment blanket and oriented fiber alumina batting which surround a secondary convection shield of nickel chromium foil. The outer skin nickel chromium layer is formed into a mesh screen so as to be easily attachable to the nozzle directly, and the silicon carbide fabric/alumina batting layers are sewn together around the secondary convection shield using Nextel or other heat resistant threads. The composite material of the present invention is very durable, flexible, can provide insulations at temperatures of around 3000° F., is aerodynamically stable to resist flutter, and can withstand acoustic (solid rocket motor induced) as well as operational induced vibration.

BRIEF DESCRIPTION OF THE DRAWING FIGURES

FIG. 1 is a side view of a section of the composite material of the present invention.

FIG. 2 is a perspective exploded view of the separate layers of the composite material of the present invention.

FIG. 3 is a side view of the section of FIG. 1 attached to the nozzle surface of a hypervelocity vehicle.

DETAILED DESCRIPTION OF THE PREFERRED EMBODIMENT

A composite material suitable for use as a high temperature insulation barrier for the outer surface of spacecraft and other hypervelocity vehicles, and particularly useful as insulation for the main engine nozzles of the Space Shuttle, is shown in FIGS. 1 and 2. In the preferred embodiment, the composite 10 is comprised of an outer skin layer 12 of nickel chromium, and an interleaved inner region 14 comprised of a top layer 16 of nickel chromium (or Nichrome) foil, a plurality of interleaved layers of a silicon carbide fabric containment blanket 18 and alumina batting 22, and a secondary layer or shield 20 of Nichrome foil. In the composite observed in FIGS. 1 and 2, there are three layers of silicon carbide fabric 18 and two layers of alumina batting 22, with two layers of silicon carbide fabric surrounding the first layer 23 of alumina batting. The secondary layer or NiCr foil and the third layer of silicon carbide surrounding the second layer 25 of alumina batting. The silicon carbide layers, alumina batting layers and secondary layer of Nichrome foil are sewn together using a heat-resistant thread 24, such as Nextel ®, an alumina-boria-silica composition. The composite material of the present invention is designed to maximize emissivity, temperature range, strength at high temperature, and flexibility, while at the same time minimizing weight, oxidation, and conductivity.

The outer skin 12 of the composite is used to contain the composite materials, and is constructed to be easily and securely attachable to the Space Shuttle engine nozzle directly. In this regard, it is preferred that the outer skin of Nichrome be formed into a mesh screen, preferably a 40×40 mesh screen having a thickness of approximately 0.015-0.025 inches, with a thickness of about 0.020 inches particularly preferred. Directly underneath the outer skin is the interleaved inner region 14 of the composite, beginning with a top layer or primary shield 16 of nickel chromium foil. This Nichrome layer should be from about 0.001 to about 0.003 inches in thickness, and the layer will function as the primary convection shield for the composite. This primary shield will be particularly useful as a hot gas impingement barrier. It is preferred that primary convection shield 16 be perforated to allow outgassing. Perforations of approximately 0.010 inches in diameter on 0.5 inch centers have been observed to be most successful in allowing outgassing while maintaining the structural integrity of the shield. The outer skin 12 and top layer 16 are preferably tufted, using NiCr 0.020 inch diameter wire or other suitable materials, to the remaining layers of the interleaved inner region 14, which are themselves sewn together with heat-resistant thread.

Underneath the primary convective shield 16, the interleaved region 14 is comprised of at least two layers of alumina batting 22, at least two layers of silicon carbide fabric 18 which should be adjacent to the alumina batting layers, and an additional layer 20 of nickel chromium, which acts as a secondary convective shield. It is preferred that NiCr layer 20 also be approximately .001-0.003 inches in thickness. The secondary shield of Nichrome is a back up to the primary convective shield 16, and will be important in the event of localized melting of the primary shield. Secondary layer or shield 20 can also be constructed with perforating if so desired. It is also preferred that the secondary shield be disposed between two of the alumina batting layers.

The alumina batting layers 23 and 25 provide the primary insulation means for the composite, and are particularly advantageous due to their lightweight nature, low conductivity, and high temperature resistance. It is preferred that the batting be comprised of oriented fiber alumina of 10-12 lb/ft$^3$ in density, and each layer should be approximately 0.20-0.30 inches in thickness, with about 0.24-0.26 inches particularly preferred. These batting layers generally will have a conductivity range of about 0.25 -2.98 BTU in hr-ft$^2$-°F. for the temperature range of 600-2400° F. The maximum performance of the insulation composite has been achieved using two layers of oriented fiber alumina of the above thickness, but additional layers at varying thicknesses may also be employed in the composite which will provide further insulation.

The oriented fiber alumina batting layers are surrounded by or are adjacent to layers 18 of silicon carbide fabric. In the embodiment depicted in the drawing FIGS., there are three layers of silicon carbide containment blankets, two of which, 27 and 28, surround the first layer 23 of alumina batting, and one, 29, which is adjacent to second alumina batting layer 25. The SiC containment blankets can be made of Nicalon ® or other suitable silicon carbide fabric and are stitched together along with the batting layers and the secondary convection shield 20 by means of heat-resistant thread 24, made of Nextel ®(alumina-boria-silica composition) or other suitable material. These silicon fabric layers are preferably about 0.010-0.020 inches in thickness with about 0.014-0.016 inches particularly preferred, and are stitched in place in interleaved region 14 by threads on approximately one inch centers. The silicon carbide fabric layers and secondary shield act to compartmentalize the oriented fiber alumina batting layers so as to keep it from migrating due to vibration. The sewn containment system will also retain strength at high temperature and maintain shape and insulating capability in the event of any localized erosion of the outer skin.

The insulation composite of the present invention is preferably directly attached to the nozzle structure of the Space Shuttle or other similar hypervelocity vehicles by means of resistance welding. By resistance welding the composite to the nozzle structure, a very lightweight direct attachment is provided which adequately secures the composite shield in place. Although the shield is preferably directly welded to the nozzle (such as an Incone 718 nozzle) by means of the outer NiCr screen, a weld-reinforcing foil such as RA330 (per AMS 5592) foil may be added on top of the NiCr screen prior to welding. The foil serves as a reinforcement and supplies a smooth surface for the resistance welding. It is generally preferred that weld spacing ranges from about 0.25 welds per inch to about 0.50 welds per inch, and is continuous around the part. This aspect of the invention i depicted in FIG. 3. As can be observed FIG. 3, an extended part of the outer NiCr screen 12 and primary convention shield 15, along with weld reinforcing foil 32, is welded directly to nozzle surface 30, e.g., at point 31, so as to best attach composite shield to the nozzle structure of the Space Shuttle.

The high temperature composite of the present invention thus provides an insulation suitable for use on Space Shuttle nozzles which can withstand re-entry hot gas impingement, large nozzle dynamic flexures, and both acoustical and operational vibrations. The high temperature composites prepared in accordance with the present invention have shown superior qualities in terms of high thermal barrier properties (withstands up to about 3000° F.), high emissivity (0.6 to 0.8), low conductivity (0.25-2.98 BTU in/hr-ft$^2$-°F. for the range of 600° -2400° F.), and in its very light weight (approximately 0.885 lbs/ft$^2$). These composites will thus be able to successfully provide insulation for nozzles in future shuttle fights, and for other similar applications.

What is claimed is:

1. A composite material suitable for use as a high temperature insulation barrier for outer surfaces of spacecraft and other hypervelocity vehicles comprising an outer skin layer of nickel chromium and of nickel chromium foil, a first layer of silicon carbide fabric under said top layer, a first layer of alumina batting under said first layer of silicon carbide, a second layer of silicon carbide fabric under said first layer of alumina, an additional layer of nickel chromium foil under said second layer of silicon carbide, a second layer of alumina batting under said additional layer of nickel chromium foil, and finally a third layer of silicon carbide fabric under said second layer of alumina an interleaved inner region comprised of a top layer 2. A composite material according to claim 1 wherein the alumina batting is comprised of oriented fiber alumina.

3. A composite material according to claim 1 wherein the alumina batting layers have a thickness of from about 0.20 to about 0.30 inches.

4. A composite material according to claim 1 wherein the alumina batting layers have a thickness of from about 0.24 to about 0.26 inches.

5. A composite material according to claim 1 wherein the layers of the interleaved inner region below the top nickel chromium foil layer have been sewn together with a heat resistant thread.

6. A composite material according to claim 5 wherein the heat resistant thread is comprised of an alumina-boria-silica composition.

7. A composite material according to claim 1 wherein the composite material is provided with means rendering it to the surface of a spacecraft or other hypervelocity vehicle.

8. A composite material according to claim 1 wherein the outer skin layer of nickel chromium is in the form of a mesh screen.

9. A composite material according to claim 1 wherein the layers of nickel chromium foil have perforations.

10. A composite material according to claim 9 wherein the perforations are approximately 0.010 inches in diameter and are disposed on 0.5 inch centers.

11. A composite material according to claim 1 wherein the silicon carbide fabric layers have a thickness of from about 010 to about 0.020 inches.

12. A composite material according to claim 1 wherein the silicon carbide fabric layers have a thickness of from about 0.014 to about 0.016 inches.

13. A composite material according to claim 1 wherein the outer skin layer of nickel chromium has a thickness of from about 0.015 to about 0.025 inches.

14. A composite material according to claim 1 wherein the nickel chromium foil layers have a thickness of from about 0.001 to about 0.003 inches.

* * * * *